United States Patent
Scott, Jr.

(10) Patent No.: US 12,452,074 B2
(45) Date of Patent: Oct. 21, 2025

(54) SYSTEMS AND METHODS FOR VALIDATING AUTHENTICITY OF DATABASES

(71) Applicant: Dell Products, L.P., Round Rock, TX (US)

(72) Inventor: Mark Edward Scott, Jr., Waco, TX (US)

(73) Assignee: Dell Products, L.P., Round Rock, TX (US)

( * ) Notice: Subject to any disclaimer, the term of this patent is extended or adjusted under 35 U.S.C. 154(b) by 213 days.

(21) Appl. No.: 18/193,798

(22) Filed: Mar. 31, 2023

(65) Prior Publication Data

US 2024/0333517 A1    Oct. 3, 2024

(51) Int. Cl.
*H04L 9/32*     (2006.01)
*G06F 16/21*    (2019.01)
*G06F 16/28*    (2019.01)

(52) U.S. Cl.
CPC .......... *H04L 9/3239* (2013.01); *G06F 16/211* (2019.01); *G06F 16/284* (2019.01); *H04L 9/3247* (2013.01)

(58) Field of Classification Search
CPC .... G06F 16/211; G06F 16/284; H04L 9/3239; H04L 9/3247
See application file for complete search history.

(56) References Cited

U.S. PATENT DOCUMENTS

| | | | | |
|---|---|---|---|---|
| 9,659,040 | B1* | 5/2017 | Bellingan | G06F 16/213 |
| 11,709,808 | B1* | 7/2023 | Dageville | G06F 16/221 |
| | | | | 707/803 |
| 2001/0018664 | A1* | 8/2001 | Jacoves | G06Q 30/0601 |
| | | | | 705/26.1 |
| 2004/0150519 | A1* | 8/2004 | Husain | G08B 13/19669 |
| | | | | 340/506 |
| 2006/0067525 | A1* | 3/2006 | Hartlage | G06F 21/121 |
| | | | | 380/28 |
| 2019/0147170 | A1* | 5/2019 | Keselman | G06F 21/602 |
| | | | | 713/189 |
| 2021/0157921 | A1* | 5/2021 | Brown | G06F 21/575 |

OTHER PUBLICATIONS

Martínez et al. "Robust hashing for models." Proceedings of the 21th ACM/IEEE International Conference on Model Driven Engineering Languages and Systems. 2018. (Year: 2018).*

* cited by examiner

*Primary Examiner* — Jay A Morrison
(74) *Attorney, Agent, or Firm* — Fogarty LLP

(57) ABSTRACT

Systems and methods for validating the authenticity of databases are described. In an illustrative, non-limiting embodiment, an Information Handling System (IHS) may include: a processor, and a memory coupled to the processor, the memory having program instructions stored thereon that, upon execution, cause the processor to: calculate a first hash of schema objects for a relational database; compare the calculated first hash of the schema objects with an expected second hash of the schema objects for the relational database; determine whether to validate of the relational database based, at least in part, on the comparison; and provide an indication of the determination to a recipient.

20 Claims, 5 Drawing Sheets

SYSTEMS AND METHODS FOR VALIDATING AUTHENTICITY OF DATABASES

FIELD

This disclosure relates generally to Information Handling Systems (IHSs), more specifically to systems and methods for validating the authenticity of databases.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs provide users with capabilities for accessing, creating, and manipulating data, and often implement a variety of security protocols in order to protect this data. Historically, IHSs have been designed to implement security paradigms that isolate them from possible security threats, much like a castle is designed and constructed to safeguard persons within its walls. In the case of a network of IHSs, for example, security systems implement strategies that isolate the entire network from threats. In effect, a set of castle walls is constructed around the entire network. While working from within the walls of such systems, users may be provided with secure and productive use of data.

However, security paradigms that isolate protected data within the walls of a castle are increasingly frustrated by the realities of modern computing. Nowadays, users expect to access protected data using a plethora of different IHSs while located at a variety of physical locations. In an effort to leverage the security of the system providing access to the data, current protocols for supporting remote access have sought to extend the defenses of the system to remote IHSs, essentially extending the castle walls to temporarily include all or part of the remote IHSs.

Databases, in particular, are subject to security incursions or other through a variety of mechanisms, such as: Structured Query Language ("SQL") injection, privilege elevation, internal actor attacks, or corruption events. For example, SQL injection is a code injection technique used to attack data-driven applications, in which malicious SQL statements are inserted into an entry field for execution (e.g., to dump the database contents to the attacker). As another example, Privilege escalation attacks can occur when a threat actor gains access to an employee's account, bypasses the proper authorization channel, and successfully grants themselves the ability to modify data in a database.

SUMMARY

Systems and methods for validating the authenticity of databases are described. In an illustrative, non-limiting embodiment an Information Handling System (IHS) may include: a processor; and a memory coupled to the processor, the memory having program instructions stored thereon that, upon execution, cause the processor to: calculate a first hash of schema objects for a relational database; compare the calculated first hash of the schema objects with an expected second hash of the schema objects for the relational database; determine whether to validate of the relational database based, at least in part, on the comparison; and provide an indication of the determination to a recipient.

In some embodiments, in order to calculate the first hash of the schema objects for the relational database, the program instructions can further cause the processor to: enumerate the schema objects for the relational database into string values; determine a cryptographic hash the string values using a cryptographic algorithm; and convert the cryptographic hash into a hexadecimal string, wherein the hexadecimal string of the cryptographic hash is the first hash of the schema objects. In some embodiments, the cryptographic algorithm is a SHA-256 cryptographic hash algorithm.

In some embodiments, in order to calculate the first hash of the schema objects for the relational database, the program instructions further cause the processor to: select a subset of fewer than all schema objects as the schema objects for the first hash of the schema objects based, at least in part, on one or more of the following criteria: the size of one or more of the schema objects, the date of creation of one or more of the schema objects, or the type of one or more of the schema objects. In some embodiments, the second hash identifies fewer than all schema objects usable to calculate the first hash.

In some embodiments, the expected second hash comprises a cryptographic signature from a software or hardware manufacturer. In some of these embodiments, in order to determine the validation of the relational database, the program instructions further cause the processor to: determine a validation of the cryptographic signature of the expected second hash using a public key of the software or hardware manufacturer; and determine the validation of the relational database based, at least in part, on the comparison and the validation of the cryptographic signature of the expected second hash.

In some embodiments, the calculated first hash of the schema objects does not compare with the expected second hash of the schema objects. In some of these embodiments, in order to determine a validation of the relational database, the program instructions further cause the processor to: determine that the relational database is not valid. In some of these embodiments, in order to provide the validation determination to the recipient, the program instructions further cause the processor to: provide an error to the recipient.

In some embodiments, the calculation, the comparison, the determination, and the providing are performed subsequent to one or more of the following: a start of the relational database; a schema change for the relational database; a transaction log file rotation; or one or more database logins added, removed, or altered.

In some embodiments, the recipient comprises an application layer. In some embodiments, the relational database is a component of a virtual appliance, and the recipient comprises a system administrator. In some embodiments, the relational database is a component of an embedded software package associated with a hardware component of the IHS, and wherein the recipient comprises an administrator of the IHS. In some embodiments, the relational database is provided by a provider network, and the recipient comprises a software application that accesses the relational database. In some embodiments, the expected second hash is stored in a filesystem of the IHS that has been validated by a kernel for the IHS using dm-verity.

In another illustrative, non-limiting embodiment, a method for providing a relational database with the capability to be validated, comprises: calculating a hash of schema objects for the relational database; determining a cryptographic signature of the hash using a private key of a software or hardware manufacturer; combining the relational database, the hash, and the cryptographic signature into a package; and providing the package to a recipient, wherein the package enables the recipient to validate the relational database using the hash and the cryptographic signature.

In some embodiments, calculating the hash of the schema objects for the relational database further comprises: enumerating the schema objects for the relational database into string values; determining a cryptographic hash the string values using a cryptographic algorithm; and converting the cryptographic hash into a hexadecimal string, wherein the hexadecimal string of the cryptographic hash is the calculated hash of the schema objects. In some embodiments, the cryptographic algorithm is a SHA-256 cryptographic hash algorithm.

In some embodiments, calculating the hash of the schema objects for the relational database further comprises: selecting a subset of fewer than all schema objects as the schema objects for the hash of the schema objects based, at least in part, on one or more of the following criteria: the size of one or more of the schema objects, the date of creation of one or more of the schema objects, or the type of one or more of the schema objects. In some embodiments, the recipient is a virtual appliance. In some embodiments, the recipient is an application provided by the software or hardware manufacturer.

In another illustrative, non-limiting embodiment, a memory storage device has program instructions stored thereon that, upon execution by one or more processors of one or more Information Handling Systems (IHSs), cause the one or more IHSs to: determine whether to validate a database based, at least in part, upon a comparison between a first hash of schema objects of a database against an expected second hash of the schema objects; and provide an indication of the determination to a recipient.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Some embodiments of the disclosed systems and methods for validating the authenticity of databases allow a software or hardware manufacturer to deliver a known database, and assert that no unexpected changes have been made to it. Some embodiments can include databases that are completely private to an implementation, such as when the database is embedded in a hardware product. Other embodiments can include databases that are loaded into the customer's existing infrastructure. In some embodiments, databases can be validated against modifications, where a software or hardware manufacturer doesn't wish changes to be made. In some of these embodiments, software or hardware manufacturer doesn't wish changes to be made even if the end-administrator may have access to the database at some point. In addition, some embodiments ensure that even a properly authorized user cannot make changes to a database, where those changes haven't been signed with keys of the software or hardware manufacturer.

Therefore, some embodiments of the disclosed systems and methods for validating the authenticity of databases provide advantages over security-based solutions that only cover authenticating, authorizing, and auditing connections to the database. Only covering authenticating, authorizing, and auditing connections to the database doesn't offer proactive validations against tampering through a legitimate connection, nor against errors that can occur through a standard process. At best, those other solutions provide mechanisms to determine when and where the attack or failure occurred.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
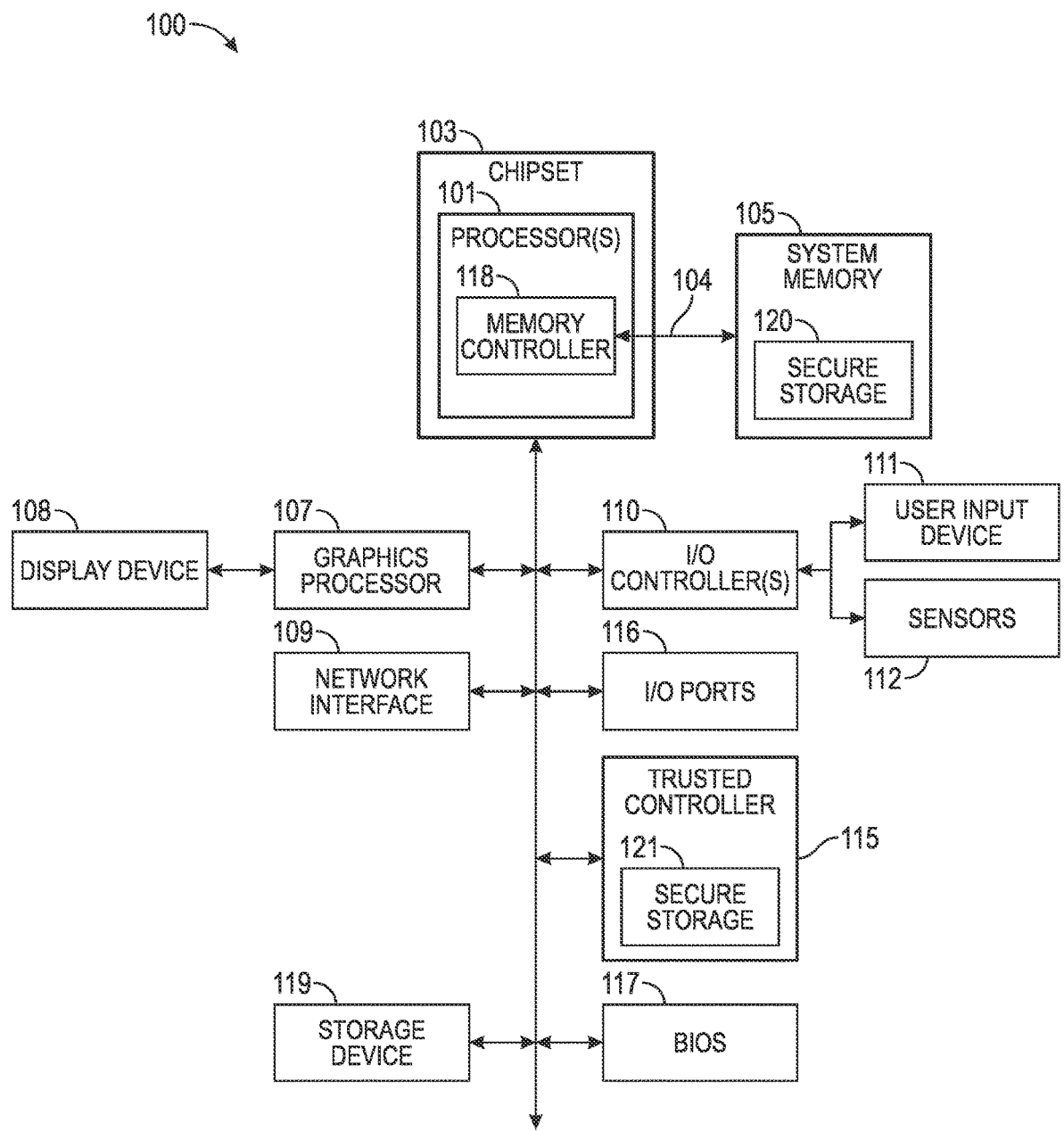
FIG. 1 is a diagram depicting illustrative components of an Information Handling System (IHS) configured, according to various embodiments, to support validating the authenticity of databases on the IHS.

An example of an IHS is described in more detail below. FIG. 1 shows various internal components of an IHS configured to implement certain of the described embodiments. It should be appreciated that although certain embodiments described herein may be discussed in the context of a personal computing device, such as laptop computers, other embodiments may utilize various other types of IHSs, such as rack-mounted servers.

FIG. 1 is a diagram depicting illustrative components of an Information Handling System (IHS) 100 configured, according to various embodiments, to support systems and methods for validating the authenticity of databases.

As shown in FIG. 1, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions. Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs. In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes secure storage 120 that may be a segregated and protected portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. As described in additional detail below, in certain embodiments, network interface 109 may support connections between a trusted IHS component, such as trusted controller 115 or Trusted Platform Module (TPM), and a remote orchestration service. In such embodiments, a connection supported by network interface 109 between the remote orchestration service and the trusted component may be considered an out-of-band (OOB) connection that is isolated from the OS of the IHS. In some embodiments, an OOB connection supported by network interface 109 may support a variety of remote management operations by trusted controller 115, including providing remote management of IHS 100 and/or of hardware components installed in IHS 100. As described in additional detail below, embodiments of IHS 100 may utilize OOB connections to interface with multiple remote orchestration services that may each provide different types of support for workspaces operating on IHS 100.

Chipset 102 of IHS 100 may also provide access to one or more display device(s) 108 via graphics processor 107. In certain embodiments, graphics processor 107 may be comprised within one or more video or graphics cards or an embedded controller installed as components of IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102. In some embodiments, an external display device coupled to IHS may include discrete logic and memory resources that may be used in the operation of a workspace. In some scenarios, an external display device coupled to IHS 100 may be a public or shared-use display monitor, such as provided to the user of IHS 100 via a shared or public workstation.

In certain embodiments, chipset 103 may utilize one or more I/O controllers 110 to access hardware components such as user input devices 111 and sensors 112. For instance, I/O controller 110 may provide access to user-input devices 111 such as a keyboard, mouse, touchpad, touchscreen and/or other peripheral input devices. User input devices 111 may interface with I/O controller 110 through wired or wireless connections. In some embodiments, any or all of the user-input devices 111 coupled to IHS may be discrete devices with their own logic and memory resources that may be used in the operation of a workspace. In some scenarios, user-input devices 111 coupled to IHS 100 may be a public or shared-use devices, such as a keyboard and mouse of a shared or public workstation.

A variety of external devices may be coupled to IHS 100, such as via I/O ports supported by I/O controllers 110 and/or via network interface 109. The external devices may include user-input devices, such as a mouse, camera or keyboard, user-output devices, such as an HMD, external display, projector or headphones. In some instances, an external device coupled to IHS 100 may include standalone IHS, such as a mobile cellular device that may be coupled to the IHS via a wired or wireless connection.

Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.). In some embodiments, any or all of the sensors 112 coupled to IHS may be discrete devices with their own logic and memory resources that may be used in the operation of a workspace.

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and are capable of determining the orientation and movement of IHS 100 (e.g., IHS 100 is motionless on a relatively flat surface, IHS 100 is being moved irregularly and is likely in transport, the hinge of IHS 100 is oriented in a vertical direction thus indicating the IHS 100 is being used in a book mode). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, inattentive and/or facing integrated display 108.

In cases where the end-user is present before IHS 100, the sensor hub may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B). As described in additional detail below, the failure to detect an authenticated user of IHS 100 within a proximity of IHS 100 may result in a change in the security context of IHS 100, thus triggering a re-evaluation of the security risk of workspaces operating on IHS 100. Similar re-evaluation may be triggered based on the detection of additional individuals in proximity to IHS 100.

In embodiments where IHS 100 may support multiple physical configurations, such as a convertible laptop, N-in-1 device, or the like, the sensor hub may utilize one or more mode sensors 112 that collect readings that may be used in determining the posture in which IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop in order to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. Starting from a closed position, a first range of hinge angles may indicate a laptop posture, a second range of hinge angles may indicate a landscape posture, and a third range of hinge angles may indicate a tablet posture of the IHS 100. The sensor hub may additionally utilize orientation and movement information collected from inertial movement sensors 112 to further determine the posture in which IHS 100 is physically configured. For instance, if the sensor hub determines that IHS 100 is configured with a hinge angle of a laptop configuration, but IHS 100 is oriented on its side with the hinge in a vertical orientation, the IHS may be determined to be in a book mode. In another example where the IHS 100 is determined to be tilted such that the hinge is oriented between horizontal and vertical, the user's face is detected to be facing the integrated display, and IHS 100 is experiencing irregular, slight movements, the sensor hub may determine that IHS 100 is being used in a book posture while the user is in transit. In another example, the sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. As described in additional detail below, the coupling of storage devices via an I/O port 116 may result in a change in the security profile of IHS 100, thus triggering a re-evaluation of the security risk of workspaces operating on IHS 100. In some embodiments, peripherals coupled to IHS 100 via I/O ports 116 may be discrete devices with their own logic and memory resources that may be used in the operation of a workspace. In some scenarios, external peripherals coupled to IHS 100 may be a public or shared-use devices, such as a projector utilized within a conference room.

Chipset 103 also provides processor(s) 101 with access to one or more storage devices 119. In various embodiments, storage device(s) 119 may be integral to IHS 100, or may be external to IHS 100. In certain embodiments, storage device(s) 119 may be accessed via a storage controller that may be an integrated component of the storage device. Storage device(s) 119 may be implemented using any memory technology allowing IHS 100 to store and retrieve data. For instance, storage device(s) 119 may be a magnetic hard disk storage drive or a solid-state storage drive. In some embodiments, storage device(s) 119 may be a system of storage devices, such as a cloud drive accessible via network interface 109. In some embodiments, storage devices 119 coupled to IHS 100 may be discrete devices with their own logic and memory resources that may be used in the operation of a workspace.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. BIOS 117 instructions may also load an OS for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, a trusted controller 115, such as a Trusted Platform Module (TPM), is coupled to IHS 100 and may support various functions for management of IHS 100. For example, trusted controller 115 may be an embedded controller (EC) that is installed as a component of the motherboard of IHS 100. In various embodiments, trusted controller 115 may perform various operations in support of the delivery and deployment of a workspace to IHS 100. In certain embodiments, trusted controller 115 may interoperate with a remote orchestration service via an out-of-band communications pathway that is isolated from the OS that runs on IHS 100. Network interface 109 may support such out-of-band communications between trusted controller 115 and a remote orchestration service. In some embodiments, such out-of-band communications may be utilized by a remote orchestration service in communicating with the trusted controller 115 in selecting the resources of the IHS that are used as the underlying computing architecture that is used to host a workspace on the IHS 100.

Trusted controller 115 may receive cryptographic information required for secure delivery and deployment of a workspace to IHS 100. In such embodiments, the cryptographic information may be stored to secured storage 121 maintained by trusted controller 115. Additionally, or alternatively, trusted controller 115 may support execution of a trusted operating environment that may support cryptographic operations used to deploy a workspace on IHS 100. Additionally, or alternatively, trusted controller 115 may support deployment of a workspace within the OS of IHS 100 via an out-of-band communications channel that is isolated from the OS and allows the workspace to communicate with a trusted agent process of the OS.

Trusted controller 115 may also provide support for certain cryptographic processing used to support secure deployment and operation of workspaces on IHS 100. In some embodiments, such cryptographic processing may be provided via a secure logical environment that operates using computational and memory resources of trusted controller 115, where the environment operates in isolation from the software and other hardware components of IHS 100. In some embodiments, trusted controller 115 may rely on cryptographic processing provided by dedicated cryptographic hardware supported by the IHS, such as a TPM (Trusted Platform Module) microcontroller. In some embodiments, the memory resources of trusted controller 115 include a secured storage 121 that may be utilized to store cryptographic information for use in authorization of workspaces.

In certain embodiments, cryptographic capabilities of trusted controller 115 may be used to calculate signatures that uniquely identify individual components of IHS 100. In such scenarios, trusted controller 115 may calculate a hash value based on instructions used to configure a hardware component coupled to IHS 100 and/or based on a set of instructions used to operate a software program. For instance, trusted controller 115 may calculate a hash value based on firmware, settings and/or other instructions that are used in the operation of a hardware component coupled to the IHS 100, such as by a network controller, storage drive, storage controller, FPGA, or hardware accelerator. In some instances, reference signatures for individual components of an IHS 100 may be calculated as part of a trusted manufacturing and factory provisioning process of the IHS and may be stored for use as reference signatures within a secure storage 121 of the trusted controller 115.

Once the IHS 100 has been delivered and deployed, trusted controller 115 may be configured to calculate hash values based on firmware and other instructions that are loaded for use by individual hardware components of the IHS. The hash value recalculated for the component may then be compared against the reference signature in order to determine if any modifications have been made to the instructions to be used to operate the component, thus indicating the component has been compromised. In this manner, trusted controller 115 may be used to validate the integrity of hardware and software components installed on IHS 100. In certain embodiments, remote orchestration service 206 may verify the integrity of trusted controller 115 in the same manner, by calculating a signature based on instructions being utilized to operate trusted controller 115 and comparing it to a reference signature calculated during a trusted process for manufacture of IHS 100. In various embodiments, one or more of these operations supported by trusted controller 115 may be implemented using BIOS 117.

In some embodiments, firmware instructions utilized by trusted controller 115 may also implement procedures for the management of power that is available for operating IHS 100. For instance, trusted controller 115 may interface with a power adapter in managing the output levels of the power adapter that may be drawn for use by IHS 100. In some embodiments, trusted controller may determine the power status of IHS 100, such as whether IHS 100 is operating strictly from battery power or is plugged into an AC power source, and may specify restrictions on power use based on the power status of the IHS. Trusted controller 115 may be used to operate a secure execution environment that may include operations for managing various core functions of IHS 100 based on power availability, such as power management and management of certain operating modes of IHS 100 (e.g., turbo modes, maximum operating clock frequencies of certain components, etc.). Accordingly, IHS 100 may support the use of various power modes. In some embodiments, the power modes of IHS 100 may be implemented through operations of trusted controller 115 and/or the OS of IHS 100. In various embodiments, IHS 100 may support various reduced power modes in order to reduce power consumption and/or conserve battery power when IHS 100 is not actively in use, and/or to control a level of performance available to the user by increasing or decreasing a maximum operating clock frequency of a component of IHS 100 (e.g., processor(s) 101).

In managing operating modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

As described in additional detail below, an IHS 100 may support the operation of one or more workspaces, each operating using resources of IHS 100 that are specified within a respective workspace definition, where an individual workspace provides operation of software programs and access to protected data in varying degrees of isolation from the operating system of the IHS and from other workspaces. Also as described in additional detail below, an individual workspace may be hosted by an IHS 100 using various combinations of the described software and hardware resources of the IHS. For instance, a workspace may be configured to operate as a type of virtual machine that runs in isolation from the operating system of the IHS 100, but that relies on certain shared software libraries and other resource of the IHS 100. In another instance, a workspace may operate as a different type of virtual machine that not only runs in isolation from the operating system of the IHS 100, but also does not share any libraries and operates using a segregated portion of memory 105 of the IHS. In another instance, a workspace may operate as a container application that runs within the operating system of the IHS 100, but that provides a segregated computing environment in which applications and data that are accessed via the container are not otherwise accessible by other programs or containers hosted by the operating system. In another instance, a workspace may operate within the operating system of an IHS 100 as a web-browser application that runs using libraries and other resources utilized by the web browser. In another instance, a workspace may be configured to operate such that a graphical interface for the workspace is displayed in a display device 108, of the IHS 100, but the workspace operates in full or in part in a cloud resource, thus isolating certain aspects of the workspace entirely from the IHS 100.

Each of these exemplary computing architectures that utilize resources of IHS 100, to support workspaces present different attack surfaces that may be exploited by malicious actors. As described in additional detail below, the computing architecture that is selected for use by a workspace may be selected based in part on a security context that may account for the security posture of the IHS 100, the user of the IHS 100, the use of subordinate workspaces, the environment in which IHS 100 is being operated and/or the information that is being accessed via the workspace. As such, the attack surface presented by the computing architecture of a workspace, and any subordinate workspaces, may be selected to be commensurate with the security context in which the workspace will operate. Further, embodiments of the present systems and methods for security auditing and remote attestation via kernel-signed metrics may be employed to secure these workspaces.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as a System-on-Chip.

Figure 2:
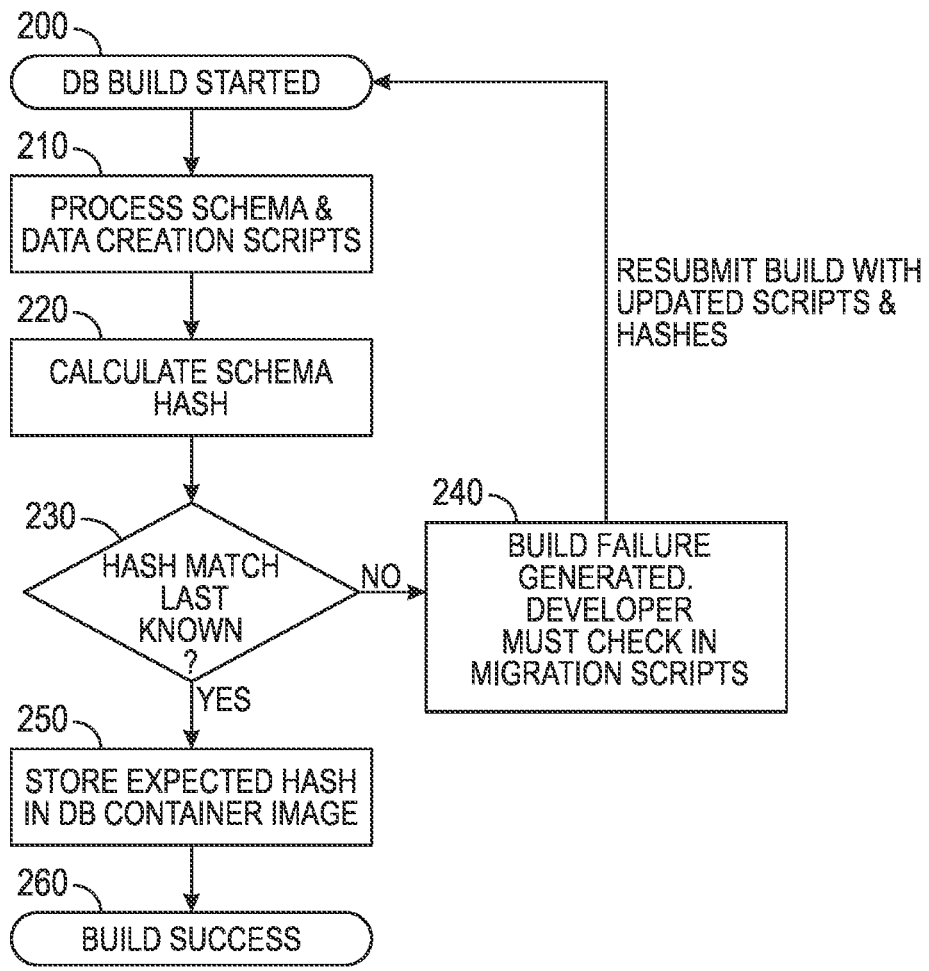
FIG. 2 is an operational flowchart diagram depicting a method for building a database for validation, according to some embodiments.

FIG. 2 is an operational flowchart diagram depicting a method for building a database for validation, according to some embodiments.

Databases can be subject to security incursions or other through a variety of mechanisms. For example, some of these mechanisms include: SQL injection, privilege elevation, internal actor attacks, and/or corruption events. Therefore, some embodiments of the present disclosure extend the database build process with a step to read and generate a cryptographic hash (e.g., a SHA-256 hash) of the currently known database schema objects. This hash can be used to represent the fingerprint of the database at any point in time. In some embodiments, the hash can be cryptographically signed with certificates of a hardware of software manufacturer. In some embodiments, the hash can be stored with the database. Some embodiments of the present disclosure can be compatible with most major relational databases.

At runtime, the database infrastructure can be augmented with the same routines to generate the schema hashes, in some embodiments. At events such as a database start, a log file rotation, and/or a schema change, the hash can be recalculated. In some embodiments, whenever the hash is calculated, it is compared against the originally stored hash. In some of these embodiments, the originally stored hash can also be signed. Some embodiments can also include a validation that the signature of the hash is still valid. If the currently calculated hash differs from the original hash, this can be returned to an application layer for appropriate actions depending on the platform. In addition, in some embodiments, if the stored hash is no longer cryptographically verifiable against a certificate (e.g., a certificate of a hardware or software manufacture), this can also be returned to an application layer for appropriate actions depending on the platform.

In some embodiments, the application layer can detect these one or more failure(s), and then immediately communicate information regarding these failure(s) to users that access a user interface. In addition, in some embodiments, security alerts can be sent out (e.g., if external notifications have been enabled). One result can be that, during a runtime operation, the application layer and/or the user can know that the database structure matches what the hardware or software manufacturer has certified. If the database structure does not match what the hardware or software manufacturer has certified, then remediation actions can be taken, in some embodiments.

Therefore, some embodiments of the present disclosure allow a software or hardware manufacturer to deliver a known database, and assert that no unexpected changes have been made to it. Some embodiments can include databases that are completely private to an implementation, such as when the database is embedded in a hardware product. Other embodiments can include databases that are loaded into the customer's existing infrastructure. In some embodiments, databases can be validated against modifications, where a software or hardware manufacturer doesn't wish changes to be made. In some of these embodiments, software or hardware manufacturer doesn't wish changes to be made even if the end-administrator may have access to the database at some point. In addition, some embodiments ensure that even a properly authorized user cannot make changes to a database, where those changes haven't been signed with keys of the software or hardware manufacturer.

Returning to the flowchart of FIG. 2, block 200 begins the database build process. Block 200 transitions to block 210 which processes schema and data creation scripts. This can create a database schema and database schema objects, along with the data for the database.

A database schema can be the structure of a database described in a formal language supported by the database management system. The term "schema" can refer to the organization of data as a blueprint of how the database is constructed, such as being divided into database tables in the case of relational databases. The formal definition of a database schema can be a set of formulas (e.g., sentences) called integrity constraints imposed on a database. These integrity constraints can ensure compatibility between parts of the schema. These constraints might be expressible in the same database language. A database can be considered a structure in realization of the database language. The states of a created conceptual schema can be transformed into an explicit mapping (e.g., the database schema). This database scheme can describe how real-world entities are modeled in the database.

A database schema can specify, based on the database administrator's knowledge of possible applications, the facts that can enter the database, or those of interest to the possible end-users. As an analogy, the notion of a database schema can be similar to the notion of theory in predicate calculus. A model of this "theory" can closely corresponds to a database, which can be seen at any instant of time as a mathematical object. Thus, a schema can contain formulas representing integrity constraints specifically for an application and the constraints specifically for a type of database. This might all expressed in the same database language, in some embodiments. In a relational database, for example, the schema might define the tables, fields, relationships, views, indexes, packages, procedures, functions, queues, triggers, types, sequences, materialized views, synonyms, database links, directories, XML schemas, or other elements of the relational database. A database might store its schema in a data dictionary.

A schema object can be a logical data storage structure, in some embodiments. A schema object can be a data structure that describes how a database is stored. A schema might comprise a collection of schema objects. Examples of schema objects can include: tables, views, sequences, synonyms, indexes, clusters, database links, snapshots, procedures, functions, and/or packages. Schema objects might not have a one-to-one correspondence to physical files on disk that store their information. However, a schema object might be stored within a tablespace of the database. The data of each object can be physically contained in one or more of the tablespace's datafiles. For some objects such as tables, indexes, and clusters, a user might specify how much disk space the database allocates for the object within the tablespace's datafiles.

After the schema and data creation scripts are processed in block 210, the flowchart transitions to block 220 which generates and/or calculates the schema hash for the database. In some embodiments, the schema hash can be generated from the schema as the database is built. In some embodiments, the schema hash can be a hash of the schema objects. In order to generate a hash of the schema objects, some embodiments can enumerate the database schema objects into string values. Then, the string values can be fed into a cryptographic (e.g., SHA-256) message digest generator. The cryptographic message digest generator can return a cryptographic hash of the string values. This can be converted into a hexadecimal string, in some embodiments. In some embodiments, the hash value can be input into a signature service to be signed. They might be signed with certificates from a hardware or software manufacturer, in some embodiments.

In some embodiments, the schema hash might be generated and/or calculated based on fewer than all the schema objects. In some of these embodiments, a subset of fewer than all the schema objects can be selected as the schema objects for the schema hash of the schema object. The selection of the schema objects can be based on one or more of the following criteria: the size of one or more of the schema objects, the date of creation of one or more of the schema objects, or the type of one or more of the schema objects, depending on the embodiment. In some embodiments, the last known hash also identifies the fewer than all schema objects that usable to calculate the schema hash.

The flowchart of FIG. 2 then transitions to block 230 which queries whether the generated and/or calculated hash matches the last known hash. If the generated and/or calculated hash does not match the last known hash, the flowchart transitions to block 240 in which a build failure is generated. In such a case, the developer can check and/or modify the migration scripts. After block 240, the developer can resubmit the database build with updated scripts and/or hashes and the flowchart can return back to block 200.

If, on the other hand, the generated and/or calculated hash does match the last known hash at block 230, then the flowchart transitions to block 250 in which the expected hash is stored in a package, such as a database container image. The hash might be stored along with the cryptographic signature and the database in the same package. The flowchart then transitions to block 260 in which there is a database build success.

Figure 3:
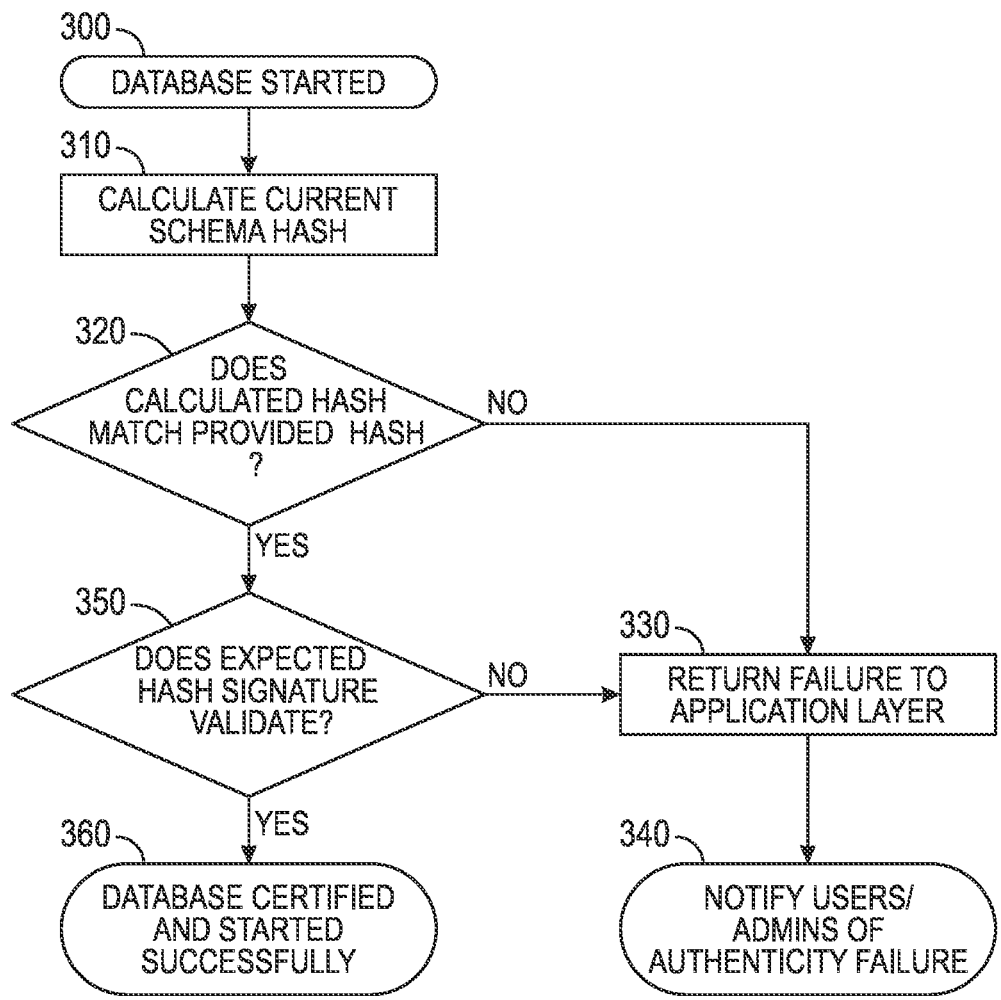
FIG. 3 is an operational flowchart diagram depicting a method for database validation at runtime, according to some embodiments.

FIG. 3 is an operational flowchart diagram depicting a method for database validation at runtime, according to some embodiments. The flowchart begins at block 300 in which the database starts. Then the flowchart transitions to block 310 which begins the database validation process. In addition to the database starting, other events can also trigger or cause the database validation process to commence. These events can be, for example, a schema change, a transaction log file rotation, and/or one or more database logins added, removed, and/or altered. Other events might also trigger the database validation process, and these listed events should not be construed as limiting.

At block 310, the current schema hash is generated and/or calculated. The schema hash might be calculated by a database management application, in some embodiments. In some embodiments, the schema hash can be a hash of the schema objects. In order to generate a hash of the schema objects, some embodiments can enumerate the database schema objects into string values. Then, the string values can be fed into a cryptographic (e.g., SHA-256) message digest generator. The cryptographic message digest generator can return a cryptographic hash of the string values. This can be converted into a hexadecimal string, in some embodiments.

In some embodiments, the schema hash might be generated and/or calculated based on fewer than all the schema objects. In some of these embodiments, a subset of fewer than all the schema objects can be selected as the schema objects for the schema hash of the schema objects. The selection of the schema objects can be based on one or more of the following criteria: the size of one or more of the schema objects, the date of creation of one or more of the schema objects, or the type of one or more of the schema objects, depending on the embodiment. In some embodiments, the expected hash also identifies fewer than all schema objects, where those fewer than all schema objects are then usable to calculate the schema hash.

The flowchart then transitions to block 320 which determines whether the calculated hash matches the expected hash. The expected hash can be provided by an entity, such as a software or hardware manufacturer, in some embodiments. If the calculated hash does not match the expected hash, the flowchart transitions to block 330 where a failure is returned to an application layer. The application layer can check for errors from the database. If the application layer detects errors, for example, it can execute application specific errors, such as a failure to load, or notification to end-users. The flowchart, therefore, transitions to block 340 in which users and/or administrators are notified of an authenticity failure. This notification might come from the application, the module and/or process that executes the database validation process, or another entity which is notified of the failure.

If, on the other hand, the calculated hash does match the expected hash at block 320, then the flowchart transitions to block 350 where determines whether the expected hash signature is validated. In some embodiments, block 350 can determine whether the expected hash signature is validated with a chain of signatures. In some embodiments, block 350 can include validating the signature of the expected hash from a hardware or software manufacturer.

If the signature of the expected hash does not validate, the flowchart transitions to block 330 where a failure is returned to the application layer, and then to block 340, similar to the "no" transition out of block 320. If, on the other hand, the signature of the expected hash does validate, the flowchart transitions to block 360 in which the database is certified and started successfully.

Figure 4:
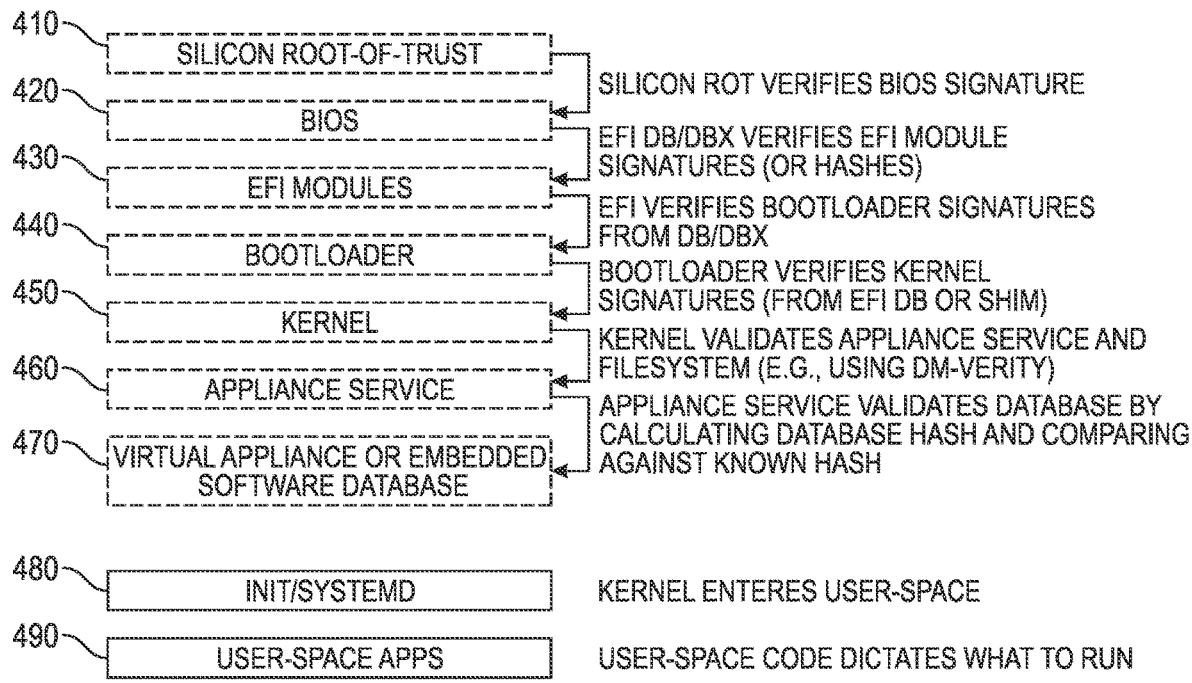
FIG. 4 is a diagram generally depicting a secure boot process incorporating the validation of a virtual appliance or embedded software database, according to some embodiments.

FIG. 4 is a diagram generally depicting a secure boot process incorporating the validation of a virtual appliance or embedded software database, according to some embodiments. FIG. 4 depicts that the kernel 450 is a third-party verifiable, auditable, cryptographically certified, trust-rooted entity, providing a more-secured source of information. FIG. 4 depicts that a kernel is "trust-rooted." Trust-rooted refers to the trustworthiness of the processes by which a modern kernel is booted and secured. First, a "Silicon Root of Trust" 410 (which can go by different names such as TrustZone or BootGuard, etc.) can verify the BIOS 420 signature. Then the BIOS 420 can verify an Extensible Firmware Interface (EFI) module 430 signature or hash. In some embodiments, an EFI database within the BIOS 420 can be accessed to help verify this. Then, EFI modules 430 can verify bootloader 440 signatures from, for example, the database. The bootloader 440 can verify kernel 450 signatures from, for example, the EFI database or a shim. A shim, for example, can be a library that transparently intercepts API calls and changes the arguments passed, handles the operation itself or redirects the operation elsewhere. The kernel 450 can then validate appliance services 460 and the filesystem. To validate the appliance services 460 or the filesystem, the kernel might use dm-verity, in some embodiments. DM-Verity is a software module that validates the data blocks contained in a file system against a list of cryptographic hash values.

The appliance service 460 can then validate a database by calculating the hash of the database, such as the hash of the schema objects of the database, and comparing it against a known hash. Thus, the appliance service can validate a virtual appliance or embedded software database. Each of these use cases are described more fully below, according to some embodiments.

The first use case is that of a virtual appliance. In such a use case, a software or hardware manufacturer can generate a virtual appliance that is distributed to customers. This virtual appliance might be intended to help customers manage their hardware in their datacenters, for example. The virtual appliance might contain a Linux distribution, in some embodiments. The distribution (e.g., Linux distribution) might include a webserver, task engine, and database (e.g., PostgreSQL) that work in conjunction to allow a datacenter administrator to discover & manage the device of the datacenter. The database to be validated can be private to the appliance, and not exposed to the outside world for read or write access, in some embodiments.

The virtual appliance can be enabled with secure boot, and a tool called dm-verity, in some embodiments. Such a type of procedure can allow a hardware manufacturer to sign the appliance's boot chain, and in turn validate that the filesystem of the appliance hasn't been changed from the build. While the database software itself can be validated by the above processes, the data files themselves have been traditionally unvalidated, as the data is expected to change during normal operations.

To extend the end-to-end validation of the appliance software, some embodiments of the present disclosure can validate that the database schema matches that which was generated during the factory build process. This in essence validates the "fingerprint" of the database.

To enable this level of detection, the following can happen, in some embodiments: (1) The BIOS can validate a kernel signature. (2) The kernel can contain dm-verity hashes for the filesystem. It can refuse to load binaries or content that has been tampered with. (3) The appliance and database services can start up. (4) The appliance service can calculate the current database hash. (5) The appliance service can compare the current database hash to the known hash stored in the filesystem (which has been validated by dm-verity). (6) If the current hash doesn't match the expected hash, normal operations might cease, and the administrator might be notified of potential tampering or errors in the appliance. (7) If the hashes match, then normal operations begin, with processes being assured of working with the correctly configured and unaltered database.

With the above in place, the appliance can be prevented from loading altered software or data. In some embodiments, the appliance can detect one or more of the following conditions in customer hypervisor environments: (1) Badly written code running in the application layer; (2) SQL injection attacks; or (3) Compromised processes leading to database access by malicious actor.

The second use case is that of a hardware with embedded software. A hardware manufacturer can manufacture a variety of hardware. Some hardware can contain, for example, an internal Linux distribution with multiple processes running that are responsible for managing or monitoring the machine or chassis. Typically, this can also include a database for persistent data storage. The database might be private to the embedded software, and not exposed to the outside world for read or write access.

In this use case, the hardware has a custom BIOS which runs only kernels signed and validated with the hardware or software manufacturer. In can run these kernels via secure boot, ensuring that the entry point in the device has been provided by the hardware or software manufacturer, and is unaltered. A kernel which a hardware or software manufacturer produces might have dm-verity enabled, which would allow it to validate the filesystem of the hardware before loading additional binaries and/or data.

While the database software itself can be validated by the above processes, the data files themselves have been traditionally unvalidated, as the data is expected to change during normal operations. However, some embodiments of the present disclosure can extend the end-to-end validation of the software stack loaded in the hardware. Some embodiments can introduce a step where it validates that the database schema matches that which was generated during the factory build process. This in essence validates the "fingerprint" of the database.

To enable this level of detection, the following can happen, in some embodiments: (1) The BIOS can validate a kernel signature. (2) The kernel can contain dm-verity hashes for the filesystem. It can refuse to load binaries or content that has been tampered with. (3) The appliance and database services can start up. (4) The appliance service can calculate the current database hash. (5) The appliance service can compare the current database hash to the known hash stored in the filesystem (which has been validated by dm-verity). (6) If the current hash doesn't match the expected hash, then a factory reset can be initiated followed by notification of the hardware administrator. (7) If the hashes match, however, then normal operations can begin, with processes being assured of working with the correctly configured and unaltered database.

With the above in place, the appliance can be prevented from loading altered software or data. In some embodiments, the appliance can detect one or more of the following conditions in running hardware in the field: (1) Badly written code running in the application layer, which creates errors in the database; (2) SQL injection attacks; or (3) Compromised processes leading to database access by malicious actor.

Returning to FIG. 4, Trusted Computing Group (TCG) standards such as Secure Boot and Measured Boot can form this secure chain which can be rooted from the very first instruction the computer issues, right up to the loading and execution of the kernel and its modules. Each stage in this process can be signed, verified, trusted, and rooted by the previous stage. A system can be configured with a very high degree of reliability that it is executing as authorized by the entity who configured this system—be that a user, administrator or a platform or solution vendor.

This chain of trust can end when the kernel modules load, and the system begins to run in user-space. At this point in time, a system will basically do whatever it has been configured to. In UNIX systems, for example, init/systemd 480 launches daemons. Users run user-space apps 490. All these can come from a filesystem. There are always new and evolving ways to secure these, but the same problems persist. The more you "lock down" a system, the more inflexible it becomes. A system can use extreme and custom measures to control what a system can do. However, most systems will trust and run whatever it is told to run, from, for example, components such as an/etc/systemd configuration file. In addition, most systems will blindly assume that whatever is on disk is "okay".

Figure 5:
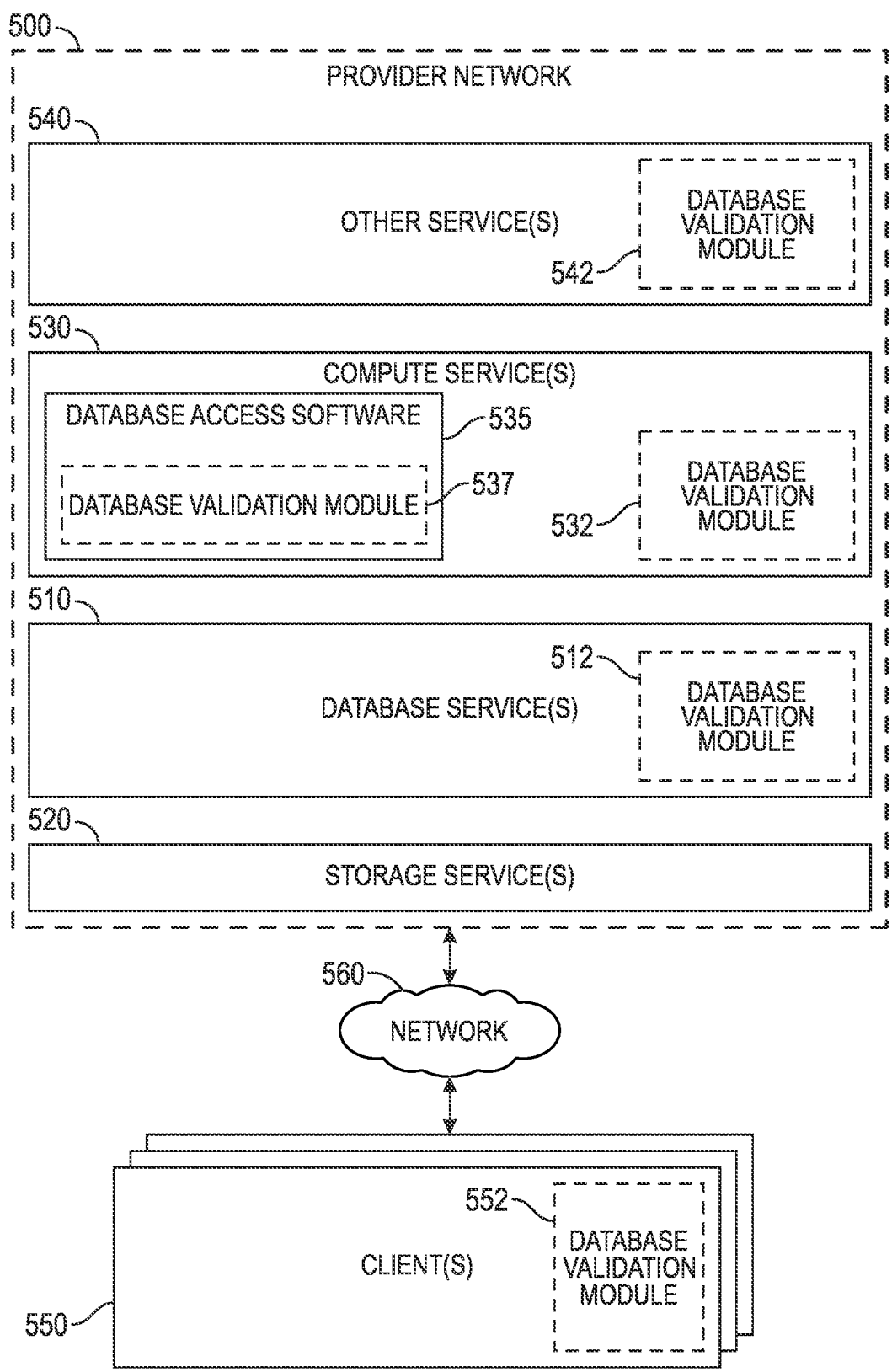
FIG. 5 is a logical block diagram illustrating a provider network that implements a database service, and incorporating one or more database validation modules, according to some embodiments.

FIG. 5 is a logical block diagram illustrating a provider network that implements a database service, and incorporating one or more database validation modules, according to some embodiments. A software developer, for example, wants to provide cloud software which runs in a provider network environment. This software might rely on a database service of the provider network, for persistent data storage. The developer might wants to ensure that the database schema/fingerprint matches what the software is expecting. Such a developer could be concerned that an unexpected change could result in the software functioning incorrectly. This could be a result of, for example: (1) An authorized administrator making changes to the database incorrectly; (2) An attacker gaining access to the database, and making changes to the database; or (3) Errors in synchronization, such as during high-availability (HA) operations.

The developer can utilize some of the embodiments of the present disclosure to validate a chain of trust by including a validation check in his software. In some embodiments, such a validation check might calculate the current hash of the database, and then compare it against the expected version. On mismatch, the developer can choose the appropriate course of action based on their product needs.

In FIG. 5, a provider network 500 may be set up by an entity such as a company or a public sector organization to provide one or more services (such as various types of cloud-based computing or storage) accessible via the Internet and/or other networks to clients 550. The Provider network 500 may include numerous data centers hosting various resource pools, such as collections of physical and/or virtualized computer servers, storage devices, networking equipment and the like (e.g., computing system 100 described above with regard to FIG. 1), needed to implement and distribute the infrastructure and services offered by the provider network 500.

In some embodiments, provider network 500 may implement various network-based services, including database service(s) 510, a storage service(s) 520, compute service(s) 530, and/or one or more other virtual computing services 540 (which may include various other types of storage, processing, analysis, communication, event handling, visualization, and security services). Each of these services might include a database validation module (512, 532, 542) which validates the database using some of the embodiments of the present disclosure. In addition, the client(s) 550 might also execute a database validation module or software component 552 that validates the databases being used by the applications the client(s) 550.

Database service(s) 510 may implement various types of database systems and formats (e.g., relational, non-relational, graph, document, time series, etc.) and the respective types of query engines to perform queries to those databases. Such services may be enterprise-class database systems that are highly scalable and extensible. Queries may be directed to a database in database service(s) 510 that are distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service(s) 510 may implement, in some embodiments, a data warehouse service that utilizes another data processing service to execute portions of queries or other access requests with respect to data that is stored in a remote data store, such as data storage service(s) 520 (or a data store external to provider network 200) to implement distributed data processing for distributed data sets.

The database service(s) can include a database validation module 512 to validate those databases, using some of the methods of the present disclosure. The database service(s) might build a database for validation, using for example, a method similar to that described in FIG. 2. The database service(s) might also validate a database as the database is being used, using for example, a method similar to that described in FIG. 3.

Storage service(s) 520 may include many different types of data stores, including a log-structured storage service or other storage services, in some embodiments, and may store database data.

Compute service(s) 530 may be various types of data processing services that perform general or specialized data processing functions (e.g., anomaly detection, machine learning, data mining, big data querying, or any other type of data processing operation). For example, in at least some embodiments, compute service(s) 530 may include a map reduce service that creates clusters of processing nodes that implement map reduce functionality over data stored in one of data storage services 520. Compute service(s) 530 may implement database validation module 532 to validate databases that the compute service(s) use, as part of the compute service's control plane, in some embodiments. In other embodiments, database access software 535 that the compute service(s) executes can include a database validation module 537 that validates a database of the database service 510 at runtime, when that database is to be used.

Clients 550 may access these various services offered by provider network 500 via network 560. Likewise, network-based services may themselves communicate and/or make use of one another to provide different services. For example, storage service 520 may store data for databases managed by database service 510, in some embodiments. It is noted that where one or more instances of a given component may exist, reference to that component herein may be made in either the singular or the plural. However, usage of either form is not intended to preclude the other embodiments.

In various embodiments, the components illustrated in FIG. 5 may be implemented directly within computer hardware, as instructions directly or indirectly executable by computer hardware (e.g., a microprocessor or computer system), or using a combination of these techniques. For example, the components of FIG. 5 may be implemented by a system that includes a number of computing nodes (or simply, nodes), each of which may be similar to the computer system embodiment illustrated in FIG. 1 and described above. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 550 may encompass any type of client configurable to submit network-based services requests to network-based services platform 500 via network 560, including requests for database services (e.g., a request to execute a transaction or query with respect to a database, a request to manage a database, such as a request to enable or disable performing queries across different types of query engines, etc.). For example, a given client 550 may include a suitable version of a web browser, or may include a plug-in module or other type of code module that can execute as an extension to or within an execution environment provided by a web browser. Alternatively, a client 550 (e.g., a database service client) may encompass an application, a web server, a media application, an office application or any other application that may make use of provider network 500 to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 550 may be an application that can interact directly with network-based services platform 500. In some embodiments, client 550 may generate network-based services requests according to a Representational State Transfer (REST)-style network-based services architecture, a document- or message-based network-based services architecture, or another suitable network-based services architecture.

In some embodiments, a client 550 (e.g., a database service client) may provide access to a database hosted in database service 510 to other applications in a manner that is transparent to those applications. For example, client 550 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to provider network 500 may be coordinated by client 550 and the operating system or file system on behalf of applications executing within the operating system environment.

Client(s) 550 may convey network-based services requests (e.g., a request to perform a transaction to a database) to and receive responses from services implemented as part of provider network 500 via network 560, in some embodiments. In various embodiments, network 560 may encompass any suitable combination of networking hardware and protocols necessary to establish network-based-based communications between clients 550 and provider network 500. For example, network 560 may generally encompass the various telecommunications networks and service providers that collectively implement the Internet. Network 560 may also include private networks such as local area networks (LANs) or wide area networks (WANs) as well as public or private wireless networks. For example, both a given client 550 and provider network 500 may be respectively provisioned within enterprises having their own internal networks. In such an embodiment, network 560 may include the hardware (e.g., modems, routers, switches, load balancers, proxy servers, etc.) and software (e.g., protocol stacks, accounting software, firewall/security software, etc.) necessary to establish a networking link between given client 550 and the Internet as well as between the Internet and provider network 500. It is noted that in some embodiments, clients 550 may communicate with provider network 500 using a private network rather than the public Internet. For example, clients 550 may be provisioned within the same enterprise as a database service system (e.g., a system that implements database service 510 and/or storage service 520). In such a case, clients 550 may communicate with provider network 500 entirely through a private network 560 (e.g., a LAN or WAN that may use Internet-based communication protocols but which is not publicly accessible).

Services within provider network 500 (or provider network 500 itself) may implement one or more service endpoints to receive and process network-based services requests, such as requests to access data pages (or records thereof), in various embodiments. For example, provider network 500 services may include hardware and/or software to implement a particular endpoint, such that an HTTP-based network-based services request directed to that endpoint is properly received and processed, in one embodiment. In one embodiment, provider network 500 services may be implemented as a server system to receive network-based services requests from clients 550 and to forward them to components of a system within database service 510, storage service 520 and/or another virtual computing service 540 for processing.

In some embodiments, provider network 500 (or the services of provider network 500 individually) may implement various user management features. For example, provider network 500 may coordinate the metering and accounting of user usage of network-based services, including storage resources, such as by tracking the identities of requesting clients 550, the number and/or frequency of client requests, the size of data tables (or records thereof) stored or retrieved on behalf of user, overall storage bandwidth used by users or clients 550, class of storage requested by users or clients 550, or any other measurable user or client usage parameter, in one embodiment. In one embodiment, provider network 500 may also implement financial accounting and billing systems, or may maintain a database of usage data that may be queried and processed by external systems for reporting and billing of client usage activity. In some embodiments, provider network 500 may be to collect, monitor and/or aggregate a variety of storage service system operational metrics, such as metrics reflecting the rates and types of requests received from clients 550, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 550 to enable such clients to monitor their usage of database service 510, storage service 520, compute service(s) 530, and/or another virtual computing service 540 (or the underlying systems that implement those services).

In some embodiments, provider network 500 may also implement user authentication and access control procedures. For example, for a given network-based services request to access a particular database, provider network 500 may implement administrative or request processing components that may ascertain whether the client 550 associated with the request is authorized to access the particular database. Provider network 500 may determine such authorization by, for example, evaluating an identity, password or other credential against credentials associated with the particular database, or evaluating the requested access to the particular database against an access control list for the particular database. For example, if a client 550 does not have sufficient credentials to access the particular database, provider network 500 may reject the corresponding network-based services request, for example by returning a response to the requesting client 550 indicating an error condition, in one embodiment. Various access control policies may be stored as records or lists of access control information by database service 510, storage service 520, compute service(s) 530, and/or other processing service 540, in some embodiments.

In accordance with the foregoing, certain embodiments employ systems and methods for validating the authenticity of databases to allow a software or hardware manufacturer to deliver a known database, and assert that no unexpected changes have been made to it.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) comprising:
a processor; and
a memory coupled to the processor, the memory having program instructions stored thereon that, upon execution, cause the processor to:
calculate a first hash of schema objects for a relational database;
compare the calculated first hash of the schema objects with an expected second hash of the schema objects for the relational database;
determine whether to validate the relational database based, at least in part, on the comparison;
determine a cryptographic signature of the first hash using a private encryption key;
combine data retained by the relational database, the first hash and the cryptographic signature into a package; and
provide the package and an indication of the determination whether to validate the relational database to a network-based recipient via a communication network, wherein the package enables the recipient to validate the relational database using the first hash and the cryptographic signature, and wherein the validation of the relational database certifies that the relational database has not been modified thereby ensuring authenticity of the relational database.

2. The IHS of claim 1, wherein to calculate the first hash of the schema objects for the relational database, the program instructions further cause the processor to:
enumerate the schema objects for the relational database into string values;
determine a cryptographic hash the string values using a cryptographic algorithm; and
convert the cryptographic hash into a hexadecimal string, wherein the hexadecimal string of the cryptographic hash is the first hash of the schema objects.

3. The IHS of claim 2, wherein the cryptographic algorithm is a SHA-256 cryptographic hash algorithm.

4. The IHS of claim 1, wherein to calculate the first hash of the schema objects for the relational database, the program instructions further cause the processor to:
select a subset of fewer than all schema objects as the schema objects for the first hash of the schema objects based, at least in part, on one or more of: a size of one or more of the schema objects, a date of creation of one or more of the schema objects, or a type of one or more of the schema objects.

5. The IHS of claim 1, wherein the second hash identifies fewer than all schema objects usable to calculate the first hash.

6. The IHS of claim 5, wherein the expected second hash comprises a cryptographic signature from a software or hardware manufacturer, and wherein to determine the validation of the relational database, the program instructions further cause the processor to:
determine a validation of the cryptographic signature of the expected second hash using a public key of the software or hardware manufacturer; and
determine the validation of the relational database based, at least in part, on the comparison and the validation of the cryptographic signature of the expected second hash.

7. The IHS of claim 1, wherein the calculated first hash of the schema objects does not compare with the expected second hash of the schema objects,
wherein to determine a validation of the relational database, the program instructions further cause the processor to:
determine that the relational database is not valid; and
wherein to provide the validation determination to the recipient, the program instructions further cause the processor to:
provide an error to the recipient.

8. The IHS of claim 1, wherein the calculation, the comparison, the determination whether to validate the relational database, and the providing are performed subsequent to one or more of:
a start of the relational database;
a schema change for the relational database;
a transaction log file rotation; or
one or more database logins added, removed, or altered.

9. The IHS of claim 1, wherein the recipient comprises an application layer.

10. The IHS of claim 1, wherein the relational database is a component of a virtual appliance, and wherein the recipient comprises a system administrator.

11. The IHS of claim 1, wherein the relational database is a component of an embedded software package associated with a hardware component of the IHS, and wherein the recipient comprises an administrator of the IHS.

12. The IHS of claim 1, wherein the relational database is provided by a provider network, and wherein the recipient comprises a software application that accesses the relational database.

13. The IHS of claim 1, wherein the expected second hash is stored in a filesystem of the IHS that has been validated by a kernel for the IHS using dm-verity.

14. A method for providing a relational database with a capability to be validated, comprising:
calculating a hash of schema objects for the relational database;
determining a cryptographic signature of the hash using a private encryption key of a software or hardware manufacturer;
combining data retained by the relational database, the hash, and the cryptographic signature into a package; and
providing the package to a network-based recipient via a communication network, wherein the package enables the recipient to validate the relational database using the hash and the cryptographic signature, and wherein the validation of the relational database certifies that the relational database has not been modified thereby ensuring authenticity of the relational database.

15. The method of claim 14, wherein calculating the hash of the schema objects for the relational database further comprises:
enumerating the schema objects for the relational database into string values;
determining a cryptographic hash the string values using a cryptographic algorithm; and
converting the cryptographic hash into a hexadecimal string, wherein the hexadecimal string of the cryptographic hash is the calculated hash of the schema objects.

16. The method of claim 15, wherein the cryptographic algorithm is a SHA-256 cryptographic hash algorithm.

17. The method of claim 14, wherein calculating the hash of the schema objects for the relational database further comprises:

selecting a subset of fewer than all schema objects as the schema objects for the hash of the schema objects based, at least in part, on one or more of: a size of one or more of the schema objects, a date of creation of one or more of the schema objects, or a type of one or more of the schema objects.

18. The method of claim 14, wherein the recipient is a virtual appliance.

19. The method of claim 14, wherein the recipient is an application provided by the software or hardware manufacturer.

20. A memory storage device having program instructions stored thereon that, upon execution by one or more processors of one or more Information Handling Systems (IHSs), cause the one or more IHSs to:

determine whether to validate a database based, at least in part, upon a comparison between a first hash of schema objects of the database against an expected second hash of the schema objects;

determine a cryptographic signature of the first hash using a private encryption key;

combine data retained by the database, the first hash and the cryptographic signature into a package; and provide the package and an indication of the determination whether to validate the database to a network-based recipient via a communication network, wherein the package enables the recipient to validate the database using the first hash and the cryptographic signature, and wherein the validation of the database certifies that the database has not been modified thereby ensuring authenticity of the database.

* * * * *